United States Patent [19]

Lomas

[11] Patent Number: 5,421,398
[45] Date of Patent: Jun. 6, 1995

[54] PUMPED CATALYST HEAT EXCHANGER

[75] Inventor: David A. Lomas, Barrington, Ill.

[73] Assignee: UOP, Des Plaines, Ill.

[21] Appl. No.: 167,476

[22] Filed: Dec. 16, 1993

Related U.S. Application Data

[63] Continuation-in-part of Ser. No. 996,540, Dec. 24, 1992, Pat. No. 5,273,107.

[51] Int. Cl.$^6$ .................................................. F28D 15/00
[52] U.S. Cl. .................................. 165/1; 165/104.18
[58] Field of Search ....................... 165/104.16, 104.18, 165/1

[56] References Cited

U.S. PATENT DOCUMENTS

| | | | |
|---|---|---|---|
| 2,377,657 | 6/1945 | Watts | 155/52 |
| 2,492,948 | 1/1950 | Berger | 252/417 |
| 2,735,802 | 2/1956 | Jahnig | 196/52 |
| 2,862,798 | 12/1958 | McKinney | 23/288 |
| 2,970,117 | 1/1961 | Harper | 252/417 |
| 3,672,069 | 6/1972 | Reh et al. | 34/20 |
| 4,238,631 | 12/1980 | Daviduk et al. | 585/469 |
| 4,396,531 | 8/1983 | Lomas | 252/417 |
| 4,434,245 | 2/1984 | Lomas et al. | 502/2 |
| 4,439,533 | 3/1984 | Lomas et al. | 502/6 |
| 4,757,039 | 6/1988 | Lomas | 502/41 |

*Primary Examiner*—A. Michael Chambers
*Attorney, Agent, or Firm*—Thomas K. McBride; John G. Tolomei

[57] ABSTRACT

A system for in direct heat exchange with particulate material permits the use of small catalyst transfer pipes increased spacing between the vessel supplying particulate material and the heat exchanger and complete isolation of the heat exchanger from high temperature particulate materials for repair while the source of particulate continues in operation. The arrangement uses a cyclic movement of fluidized particulate material from a particle bed through a supply line to a heat exchanger and back from the heat exchanger to a particulate bed through a return line. Pressurization and depressurization of a particulate material containing volume within the heat exchanger creates the cyclic flow of particulate material in through the supply line and out through the return line. This system is particularly beneficial for the fluidized catalytic cracking process and removes essentially all limitations on the distance between a catalyst cooler and the regenerator. With this system a pair of coolers can be located at grade for an unvarying supply of steam and safely isolated for servicing of one or both of the exchangers while the regenerator is on stream.

10 Claims, 4 Drawing Sheets

PUMPED CATALYST HEAT EXCHANGER

CROSS-REFERENCE

This application is a continuation-in-part of U.S. Ser. No. 07/996,540 filed Dec. 24, 1992, now U.S. Pat. No. 5,273,107.

FIELD OF THE INVENTION

This invention relates to methods and heat exchangers for heating or cooling particulate material. More particularly, this invention relates to methods for heating or cooling hot particles by indirect heat exchange and heat exchangers for use therein.

BACKGROUND OF THE INVENTION

Heat exchangers for heating or cooling particulate comminuted or fine grade material by indirect contact with a heating or cooling fluid are well known. Heat exchangers of this type maintain the particulate material in a fluidized state with a fluidizing medium that passes upwardly through a bed of the material. A series of conduits comprising tubes, channels or coils are positioned within the fluidized bed. A fluid passes through the conduits to add or remove heat from the fluidized solids by indirect heat exchange. Fluidized solids are continuously supplied to the fluidized bed and fluidized solids are continuously withdrawn from the bed. Methods of supplying or withdrawing solids from the bed through the exchanger include flow through and backmix type exchangers. There are two basic versions of flow through coolers; one uses gravity feed wherein particulates enter an upper inlet and exit a lower outlet, and the other employs fluidized transport that moves particles from a lower inlet past the cooling conduits and out an upper outlet. In a backmix operation particles are circulated through a common inlet and outlet that exchanges particles with the rest of the process.

Heat exchangers for the indirect heating or cooling of particulate material have found widespread application in a number of industrial processes. These processes include treatment of mineral matter, the handling of metallurgical ores, the manufacture of petrochemicals and the conversion of hydrocarbons. A number of exchanger configurations have evolved to suit the needs of these different processes.

Indirect heat exchangers of the above-described type have been finding increasing use as particle coolers on the regenerators of processes for the fluidized catalytic conversion of hydrocarbons. The fluidized catalytic cracking process (hereinafter FCC) has been extensively relied upon for the conversion of hydrocarbon streams such as vacuum gas oils and other relatively heavy oils into lighter and more valuable products. In the FCC process, starting hydrocarbon material contacts a finely divided particulate catalyst which is fluidized by a gas or vapor. As the particulate material catalyzes the cracking reaction, a by-product of the cracking reaction referred to as coke is surface-deposited thereon. A regenerator, which is an integral part of the FCC process, continuously removes coke from tile catalyst surface by oxidation. Oxidation of the coke releases a large amount of heat which in pan supplies the heat input needed for the cracking reaction. As FCC units have been called upon to process heavier feeds, greater amounts of coke must be removed in the regeneration zone with a corresponding increase in the amount of heat generated therein. This additional heat poses a number of problems for the FCC process. The excess heat can upset the thermal balance of the process thereby requiring a lowering of the circulation of hot catalyst from the regenerator to the reactor which in turn can lower the yield of valuable products. In addition, the excess heat may raise temperatures to the point of damaging the equipment or catalyst particles. Therefore, it is advantageous to have a means of lowering the regenerator temperature. For reasons of temperature control and process flexibility, heat exchangers having cooling tubes located outside the regenerator vessel have become the method of choice.

An important consideration in the FCC process as well as other processes that involve the handling of particulate material is the transport of the particulate material. It is often difficult to incorporate a heat exchanger having the necessary dimensions to provide the desired degree of particulate heat transfer into the constraints of the process arrangement. In the main, these constraints involve obtaining sufficient exchanger length to accommodate the required surface area of the exchanger conduits and providing inlets and outlets for the movement of the particles between the exchanger and the rest of the process unit. In the case of an FCC process unit, addition of a particle heat exchanger may necessitate raising the entire structure, or the incorporation of extra conduits and fluidization devices in order to meet the exchanger design requirements. When the particle heat exchanger is added to a newly designed FCC unit, the increased elevation and/or added conduits and fluidization devices raise costs and complicate construction of the unit. It is also popular to retrofit particulate heat exchangers into existing FCC process units. In these cases, the structural constraints may not only add to the cost of the unit, but may not permit the incorporation of a particulate exchanger having the desired heat removal capacity.

The use of a backmix type exchanger, as previously mentioned, will simplify the incorporation of the particle heat exchanger into any process since it only requires the use of a single inlet/outlet conduit. However, the overall heat exchange capacity of this type of device is limited by the amount of catalyst circulation that can be obtained over its vertical length. Moreover, the overall heat transfer per length of cooling conduit available in the backmix cooler is lower than in the flow through type exchanger where catalyst flows from an inlet in one end of the heater exchanger to an outlet at the opposite end. Finally, an additional layout constraint of the backmix type cooler is its need for a very large inlet/outlet conduit in order to obtain adequate particle circulation between the heat exchanger and a retention bed from where the heated and cooled particles are withdrawn and returned. Therefore, the backmix type exchanger cannot overcome many of the layout problems associated with the incorporation of a remote particle heat exchanger into a process that requires heating or cooling of particulate material.

INFORMATION DISCLOSURE

U.S. Pat. No. 2,377,657 issued to G. W. Watts shows a process involving the transport of particulate material, comprising a catalyst for use in a fluidized catalytic cracking process by gravity flow into an inlet located at one end of an elongated heat exchanger that cools the particles by indirect contact with water. The water passes through a series of conduits for the regeneration of steam. Cooled particles leave through an outlet located at an opposite end of the exchanger and are transported away from an outlet by a fluidizing medium. This reference is cited for its general showing of a particle heat exchanger having gravity feed of particulate material.

U.S. Pat. No. 2,862,798 issued to McKinney teaches a process for cooling FCC catalyst particles wherein the particles are withdrawn from a regenerator by gravity flow and transported by fluidizing medium upwardly through a particulate heat exchanger for indirect cooling with a cooling fluid medium. The fluidizing medium transports the catalyst upwardly to a cooler outlet and back to the regenerator. This reference shows the use of a fluidizing medium to transport particulate material through a heat exchanger.

U.S. Pat. No. 2,970,117 issued to Harper shows a particle heat exchanger that receives hot catalyst particles from an FCC regenerator through an upper inlet and empties the particles from a lower outlet into a riser conduit that uses a fluidizing gas to transport the cooled catalyst particles back to the regenerator. This reference shows the use of a fluidizing medium to transport cooled particulate material back to the vessel from which it was withdrawn.

U.S. Pat. No. 3,672,069 issued to Reh et at. shows a backmix type fluidized bed heat exchanger where catalyst is mixed by a fluidizing gas in a series of compartments and transported across the top of the compartments. Each succeeding compartment has a lower elevation so that the particles gravitate to a final compartment from which the particulate material is withdrawn. Conduits within the compartments receive a heat exchange fluid for cooling or heating of the particulate material. This reference shows the generalized use of backmix type particle heat exchangers.

In U.S. Pat. No. 2,492,948 a heat exchanger for cooling particulate material receives FCC catalyst particles at its upper end through an outer annular area which carries the catalyst to the bottom of the heat exchanger where a fluidizing medium transports the catalyst upwardly through a series of conduits containing cooling fluid and ejects the catalyst back into the regenerator at a higher elevation than that from which it was withdrawn. This reference shows a particle heat exchanger having internal means for receiving and transporting catalyst through the device.

U.S. Pat. No. 4,439,533 issued to Lomas et at. depicts a particle heat exchanger of the backmix type that exchanges FCC catalysts between the heat exchanger and a catalyst particle retention zone in the regenerator. This reference shows the use of a backmix catalyst cooler in an FCC process.

U.S. Pat. No. 4,434,245 issued to Lomas et al. is directed to the use of a particle heat exchanger in an FCC process having a catalyst disengaging zone and a separate combustion zone. Hot catalyst particles are taken from the disengaging zone, transported downwardly through the cooler in indirect heat exchange with a cooling fluid and taken from the bottom of the heat exchanger to a lift riser for transport of the catalyst into the combustion zone. This reference shows the use of a particle heat exchanger in an FCC process having a lower combustion zone and an upper catalyst retention zone.

In U.S. Pat. No. 4,396,531, hot catalyst from the retention zone of an FCC regenerator supplies particulate catalyst to a heat exchanger for cooling the particulate catalyst by indirect contact with water and transfers the cooled catalyst to an FCC reactor. This reference shows the removal of cooled particulate material from the FCC regeneration zone.

U.S. Pat. No. 4,238,631 issued to Daviduk et al. shows a heat exchanger for cooling particulate catalyst from an FCC regenerator having a hot catalyst inlet in the middle of the heat exchanger vessel, a catalyst outlet at the bottom of the heat exchanger vessel for returning catalyst to the regenerator, and a conduit at the top of the exchanger for venting gas from the heat exchanger back to the regenerator. Cooling fluid conduits located below the catalyst inlet remove heat from the catalyst by indirect heat exchange therewith. This reference shows a particle inlet in a mid portion of a particle heat exchanger.

U.S. Pat. No. 2,735,802 issued to Jahnig depicts a particulate heat exchanger that receives particulate catalyst from an FCC regenerator through an inlet located at a mid portion of the heat exchanger. Catalyst is returned to the regenerator through an outlet located at the bottom of the heat exchanger and a conduit located at the top of the heat exchanger vents gases back to the regenerator. The exchanger has conduits above and below the catalyst inlet for circulating coolant. The inventory of catalyst particles in the heat exchanger is adjusted to vary the level of catalyst in the heat exchanger and in contact with the cooling conduits in order to vary the amount of heat removal. This reference shows a heat exchanger with heating and cooling conduits above and below a particle inlet.

U.S. Pat. No. 4,757,039 issued to Lomas shows a catalyst cooler arrangement for an FCC regenerator that can return catalyst cooled by the catalyst cooler inlet or to a separate Standpipe that delivers catalyst to other locations in the regeneration zone.

SUMMARY OF THE INVENTION

This invention is a method of heating or cooling particulate material by indirect heat exchange of the particles with a heat exchange fluid in a heat exchanger that can be located at a remote location well-removed from the supply and return points of the particulate material. This method uses a cyclic pressurization and depressurization of a particle retention volume within the heat exchanger to transport particles into and out of the heat exchanger. Differences in pressure between the supply point and the return point for the particulate material or the use of an external stream such as a fluidizing gas can provide the pressurization and depressurization. Whether there is a readily usable pressure differential between the source and supply of the particulate material or external fluidization and vent streams are used for pressurization and depressurization, the invention uses separate supply and return lines to maximize the temperature differential of the particulate material entering and leaving the heat exchange zone. The pumping action provided by the pressurization and depressurization permits the use of very small lines to withdraw and return particulate material. These small lines facilitate the positioning of the heat exchange zone in areas that are convenient for servicing the exchanger and may be well away from the source of the particulate material undergoing heating or cooling.

The method of this invention lends itself to simple integration into existing regenerators with a minimal amount of modifications and additional equipment. In particular, this invention also eliminates the need for a large opening and a short distance between the heat exchanger and the bed retaining the catalyst particles in the operation of a backmix type heat exchanger. Since the cyclic pressurization and depressurization of this invention can use ordinary vent gas or, although less preferred, no vent gas at all, the operational cycle is easily and cheaply incorporated into an existing unit. As a result this invention does not require large amounts of additional equipment over that ordinarily required for a cooler.

Accordingly, it is an object of this invention to increase the heat transfer capacity of particle heat exchangers.

It is a further object of this invention to provide a method of cooling particles and a particle heat exchanger having improved heat transfer capacity.

Another object of this invention is to provide a particle heat exchanger that is easily adapted to the configuration of the equipment supplying the particles.

A yet further object of this invention is to improve the method of regulating heat transfer in the indirect heat exchange of particles with a heat exchange fluid.

An additional object of this invention is the simplification of methods for withdrawing and returning particles from and to different locations of the equipment supplying particulate material.

A yet additional object of this invention is to provide a heat exchanger arrangement for cooling particulate material that can transport the particulate material over significant distances between the equipment supplying the particulate material and the heat exchange zone.

Accordingly, in one embodiment this invention is a method for indirect heat exchange between fluidized particles and a heat exchange fluid. The method comprises collecting particles in a particle bed and transferring the particles out of the bed into a particle retention volume of a heat exchange zone through a first exchange conduit. Indirect heat exchange of the particles in the heat exchange zone transfers heat between the particles and the heat exchange fluid. A second particle exchange conduit transfers at least a portion of the particles out of the particle retention volume and into the bed. Cyclic pressurization and depressurization of the particle retention volume effects the transfer of particles into the particle retention volume through the first particle exchange conduit and transfer of particles out of the particle retention volume through the second particle exchange conduit.

In another embodiment, this invention is an apparatus for heating or cooling fluidized particles. The invention comprises a shell and tube heat exchanger defining a particle retention volume and a plurality of heat exchange tubes located in the heat exchanger. A particle supply conduit and a particle return conduit communicate with the particle retention volume. Means for cyclicly pressurizing and depressurizing the particle retention chamber effect the transfer of particles into the particle retention volume through the particle supply conduit and the transfer of particles out of the particle retention volume through the particle return conduit.

In a more limited embodiment, this invention is an apparatus for heating fluidized particles. The apparatus includes a shell and tube heat exchanger defining a particle retention chamber and having a plurality of heat exchange tubes. A supply conduit communicates with the particle retention chamber for transferring particles into the particle retention chamber and a supply valve positioned across said supply conduit can interrupt particle flow through the supply conduit. A return conduit communicates with the particle retention chamber for returning particle to the retention chamber and a return valve positioned across the return conduit can interrupt particle flow through the return conduit. Means for closing one of the return valve or the supply valve pressurizes or depressurizes the particle retention chamber and effects the transfer of particles into the particle retention chamber through the supply conduit or transfer of the particles out of the particle retention chamber through the return conduit. (Insert #2)

The method and apparatus of this invention have been found to be particularly beneficial for back mix type heat exchangers that operate to cool catalyst. This invention eliminates the need for a large opening to promote reflux catalyst circulation about the top of the cooler. Catalyst pumping by the cyclic pressurization and depressurization of this invention forces catalyst circulation through even a relatively small catalyst inlet and outlet passageway and can pass fluidizing gas out of an even smaller gas vent. A positive cyclic exchange of hot catalyst maintains a high average heat transfer condition in the cooler by the regular addition of a large volume of hot catalyst. Therefore this invention improves the typical backmix arrangement having an inlet at the top of the cooler.

Nevertheless a heat exchanger operating in accordance with this invention can generally have the transfer conduit inlet and outlet for particle exchange passageway located at any point on the exchanger. The only requirement of the pumping action is communication of the heat exchange zone with a source of particles having sufficient density or pressure head to drive the particles into the heat exchange zone; a particle retention volume for cycling particles into and out of the heat exchange zone; and means for intermittently restricting flow in a vent line, particle return line, or particle supply line to pressurize and depressurize the heat exchanger. In operation, the particle head associated with the particle source pushes particles into the particle retention volume through a supply passageway to build up an inventory of particles. Pressure in the retention volume builds up to the level of the entering particle stream or is further increased by an external stream such as fluidizing gas. Pressure in the retention volume pushes particles from the retention volume causing the particles to flow out of the heat exchanger through the return passageway. After the particles flow out of the retention volume ceases, particles again flow into the heat exchanger through the supply passageway as the retention volume fills and the cycle repeats.

A variety of valve or flow restriction combinations across vent, supply and return conduits can provide the pressurization and depressurization-cycle. The pressurization and depressurization may rely on any combination of complete or partial flow interruption of one or more conduits. For example restriction of flow through a line supplying particles from a relatively high pressure source can promote the withdrawal of particles through an unrestricted return conduit. In such an operation the addition of fluidizing gas to the retention zone can increase gas flow to increase the pneumatic transfer of particles. With the addition of a vent gas stream, particles may flow from a relatively low pressure particle source into the retention zone and back to a relatively higher pressure particle return zone. In such an operation a retention zone vent lowers the pressure of the retention zone while the return line is closed and the supply line is open to fill the retention zone with particles. As the cycle continues the supply line and vent lines close and fluidization gas pushes particles through the now open return line into the relatively higher pressure particle return zone.

These simple requirements pose few restrictions and leave a great deal of flexibility in the heat exchanger design. Again the heat exchanger can employ relatively small conduits for particle exchange and gas venting. In addition these conduits do not require gravity flow or upward transport conditions to move particles between the heat exchanger and another vessel. Moreover, with a suitable transfer system the heat exchanger can accept and reject catalyst at any location over the length or height of the heat exchanger. Therefore, this invention frees the heat exchanger from the requirement of having a location adjacent to the vessel supplying the particulate material.

Other embodiments, details and arrangements of the present invention are described in the following detailed description.

DETAILED DESCRIPTION OF THE INVENTION

The present invention, in its process aspects, consists of steps for the heating or cooling of a fluidized particulate solid. The method and apparatus of this invention can be used for either the heating or cooling particles, however, for the sake of simplicity, the description will only make reference to particle cooling. An important application of the invention will be in a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produce a dense phase fluidized bed of hot fluidized solid particles cooled by the process of this invention.

The above combustion zone may be in dilute phase with the hot particles transported to a disengaging zone wherein the hot particles are collected and maintained as the first mentioned bed, or the combustion zone may be in dense phase and in itself comprise the first bed. The term "dilute phase", as used herein, shall mean a mixture of catalyst particles and gas having a density of less than 30 lbs/ft$^3$, and "dense phase" shall mean a density of such mixture equal to or more than 30 lbs/ft$^3$.

In a particularly important embodiment of the invention, there will be included steps for the regenerative combustion within a regeneration zone of a coke containing FCC catalyst from a reaction zone to form hot flue gas and hot regenerated catalyst, disengagement and collection of the hot regenerated catalyst, cooling of the hot regenerated catalyst in a heat removal or, as more often referred to, cooling zone, comprising the heat exchange zone or exchanger of this invention and the return of the cooled regenerated catalyst to the regeneration or reaction zone for control of the temperatures of the catalyst therein. For the purposes of an FCC process, the term "hot regenerated catalyst" means regenerated catalyst at the temperature leaving the combustion zone, typically ranging from about 1250° to about 1450° F., while the term "cool regenerated catalyst" means regenerated catalyst at the temperature leaving the cooling zone, the latter of which is up to 200° F. less than the temperature of the hot regenerated catalyst.

Figure 1:
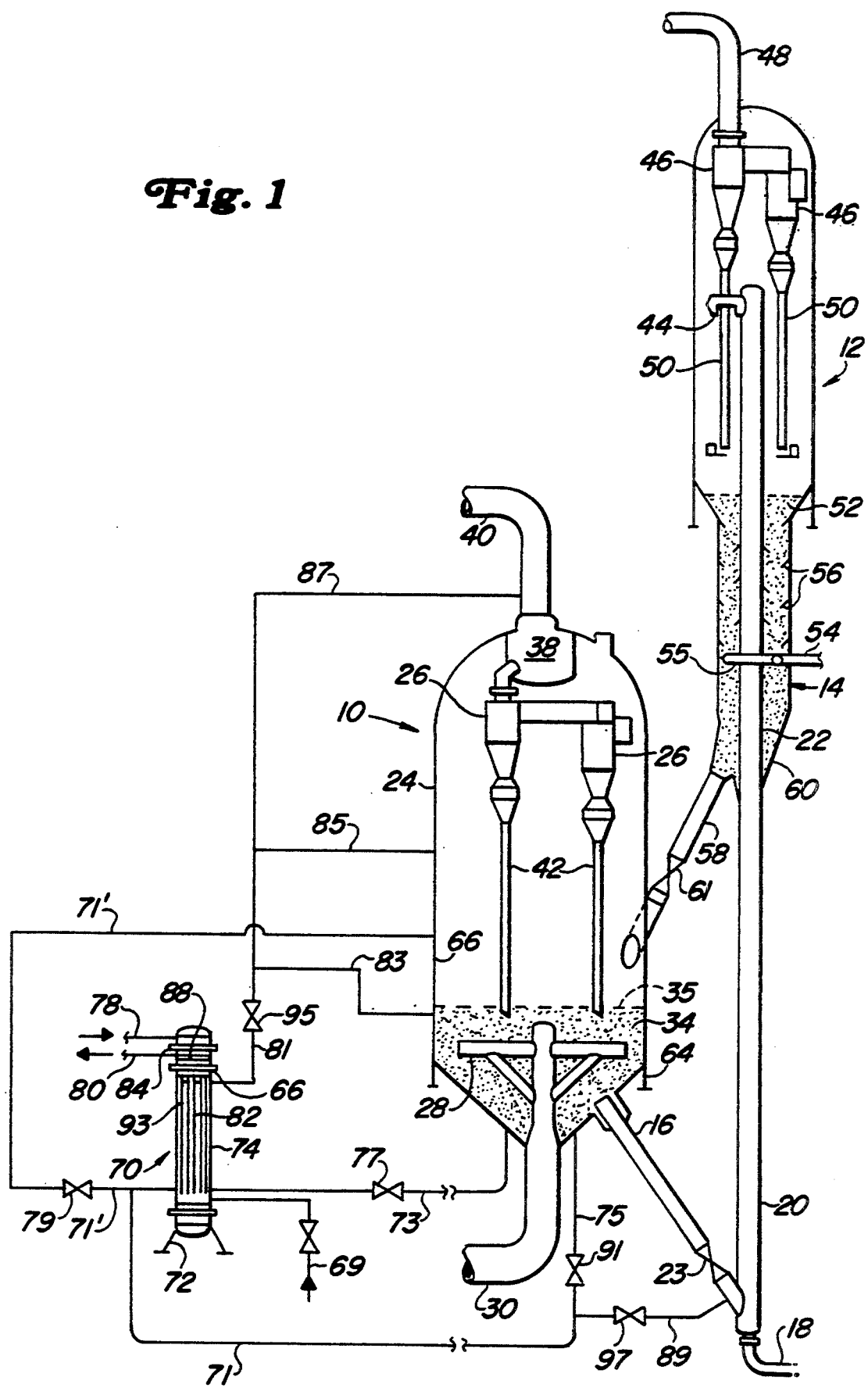
FIG. 1 is an elevation view of an FCC reactor-regenerator having a particle exchanger of this invention.

Reference will now be made to FIG. 1 for a discussion of the particle heat exchanger and the method of invention. FIG. 1 depicts the arrangement of this invention applied to a heat exchanger in the form of a vertical heat exchanger, also referred to as a cooler. The cooler is similar in many respects to a backmix type cooler which is more fully disclosed in U.S. Pat. No. 4,971,767, the contents of which are hereby incorporated by reference. Additional details on the operation of a backmix cooling zone can be found in U.S. Pat. No. 4,439,533, the contents of which are hereby incorporated by reference.

Looking then at FIG. 1, the FCC arrangement has a regeneration vessel 10 supported by a skin 64, a reactor 12, located to the side and above the regenerator, and a stripping vessel 14 located directly below the reactor. A regenerated catalyst conduit 16 transfers catalyst from the regenerator through a control valve 23 and into a riser conduit 20 where it contacts hydrocarbon feed entering the riser through hydrocarbon feed conduit 18. Conduit 18 may also contain a fluidizing medium such as steam which is added with the feed. Expanding gases from the feed and fluidizing medium convey catalyst up the riser and into internal riser conduit 22. As the catalyst and feed pass up to the riser, the hydrocarbon feed cracks to lower boiling hydrocarbon products.

Riser 22 discharges the catalyst and hydrocarbon mixture through opening 44 to effect an initial separation of catalyst and hydrocarbon vapors. Outside openings 44, a majority of the hydrocarbon vapors continue to move upwardly into the inlet of cyclone separators 46 which effects a near complete removal of catalyst from the hydrocarbon vapors. Separated hydrocarbon vapors exit reactor 12 through an overhead conduit 48 while a dip leg conduit 50 returns separated catalyst to a lower portion of the reactor vessel. Catalyst from riser outlets 44 and dip leg conduit 50 collects in a lower portion of the reactor forming a bed of catalyst 52. Bed 52 supplies catalyst to stripping vessel 14. Steam entering stripping vessel 14 through a conduit 54 is distributed by a ring 55 and rises countercurrent to a downward flow of catalyst through the stripping vessel thereby removing sorbed hydrocarbons from the catalyst which are ultimately recovered with the steam by cyclone separators 46. In order to facilitate hydrocarbon removal, a series of downwardly sloping baffles 56 are provided in the stripping vessel 14. A spent catalyst conduit 58 removes catalyst from a lower conical section 60 of stripping vessel 14. A control valve 61 regulates the flow of catalyst from conduit 58.

Regeneration gas, such as compressed air, enters regenerator 10 through a conduit 30. An air distributor 28 disperses air over the cross-section of regenerator 10 where it contacts spent catalyst in bed 34 having an upper bed level 35. Coke is removed from the catalyst by combustion with oxygen entering from distributor 28. Combustion byproducts and unreacted air components rise upwardly along with entrained catalyst through the regenerator into the inlets of cyclones 26. Relatively catalyst-free gas collects in an internal chamber 38 which communicates with a gas conduit 40 for removing spent regeneration gas from the regenerator. Catalyst, separated by the cyclones drops from the separators through dip leg conduits 42 and returns to bed 34.

A catalyst cooler 70 (heat exchanger) is located apart from regenerator 12 and independently supported by a support skirt 72. Catalyst cooler 70 is an inverted type cooler and includes a tube section 74 into which a tube bundle 82 depends in a substantially vertical direction from tube sheet support flanges 66. The shell side of the heat exchanger, i.e.,the volume outside the tubes and inside tube section 74 defines the retention volume or retention chamber 93.

Tube section 74 of cooler 70 houses a heat exchanger having catalyst on its shell side and a heat exchange medium, circulated by lines 78 and 80, on the tube side of tube bundle 82. The tubes in tube bundle 82 are bayonet type tubes in which all of the tubes are attached the tube sheet support flange 66. In the bayonet type tube design a sealed outer tube has an unattached bottom end and a top end fixed to tube sheet 66. The outer tube covers an internal tube that extends from just below the bottom of the bayonet tube to an internal tube sheet supported by a flange 84. The heat exchange fluid travels down the internal tubes and upwardly between the inner tube and the outer tube where it is collected in a chamber 88 located between the upper tube sheet and the lower tube sheet. A typical configuration of tubes in the bayonet-type bundle would be one inch tubes each depending from an inlet manifold in the head of the exchanger down into the shell through a three inch tube sealed at its bottom. Each one inch tube empties into the three inch tube in which it is contained just above the sealed end of the three inch tube. A liquid, such as water, would be passed down into the one inch tubes, would empty into the three inch tubes, would absorb heat from the hot catalyst through the wall of the three inch tubes as it passes upwardly through the annular space of the three inch tubes and would exit the heat exchanger, at least partially vaporized, from the outlet manifold. The preferred heat exchange medium would be water which, in further preference, would change only partially from liquid to gas phase when passing through the tubes. It is also preferable to operate the heat exchanger so that the exchange medium is circulated through the tubes at a constant rate.

Fluidizing gas, when present, will typically comprise air, and will typically enter the exchanger 70 through line 69. A distributor (not shown) located at the bottom of the heat exchanger 70 distributes the fluidizing gas between the tubes. As fluidizing gas enters the retention volume, it rises and collects first in the top of retention chamber 93. A conduit 81 vents fluidizing gas from the retention chamber and a valve 95 can be provided to control flow through conduit 81.

The heat exchanger arrangement will remove heat from catalyst particles that are circulated to and from bed 34. At least one pair of lines, 71 and 73, will carry catalyst from bed 34 to heat exchanger 70 and return catalyst from heat exchanger 71 to bed 34. Either lines 71 or 73 may be used as the return or supply conduit for the transfer of particles between bed 34 and heat exchanger 70. However, in order to obtain the benefits of this invention, one of the conduits will supply catalyst and the other conduit will withdraw catalyst on a regular basis. The supply of catalyst from one conduit and the return of catalyst from the other will avoid the mixing of cooled catalyst withdrawn from the heat exchanger with hot catalyst entering the heat exchanger, For example, conduit 73 would act as the supply conduit and withdraw catalyst from bed 34. While conduit 71 and 75 return cooled catalyst to bed 34. The supply function of conduit 73 may be reversed with the return function of conduit 71 and 75 on a periodic basis; however, to achieve substantial benefits from this invention, the heat exchanger should go through several cycles before reversing the function of the supply and return lines.

The arrangement of this invention advantageously permits the use of small diameter supply and return lines for the supply and return lines. Small diameter for most heat exchanger arrangements will mean a line diameter of less than 8 inches and more preferably of six inches or less. In many heat exchanger arrangements this invention permits 3 to 4 inch supply and return lines to transport particles material over distances of 10 feet or more.

The cooler itself may be horizontal or vertical with a tube bundle extending upwardly, horizontally or downwardly (as depicted) and the conduits may supply or withdraw catalyst from the top, bottom, or middle of the cooler. The most effective exchange of particles is obtained when the transfer lines are located at the bottom of the cooler exchanger since then gravity is also assisting the particle transfer by increasing the density of particles at the bottom of the cooler. However, locating the inlet for the return conduit, i.e., conduit 71, at the top of heat exchanger 70 relies on gas velocity during the depressurization of the heat exchanger in order to fluidize particles and transport them with vented gases back into the regeneration zone. When relying on fluidization to carry catalyst back into the regeneration vessel, the return conduit should discharge gas and catalyst above bed level 35 to maximize the pressure difference between the supply and withdrawal of catalyst.

Cooled catalyst particles form heat exchanger 70 may be returned to a variety of locations within the regeneration zone. Cooled catalyst from line 71 may be returned to a low pressure dilute phase location via line 71 back to bed 34 by a line 75 or directly into the riser via a line 89, to name just a few locations. A typical heat exchanger arrangement may contain one or more of line 71, 75, and 89. Selective control of valve 79, 91, and 97 can vary the return of cooled particles to the desired location. A typical heat exchanger arrangement will vent fluidizing gas from the top of the cooler via one of lines 83, 85, or 87.

The heat exchanger or cooler of this invention will normally operate in two different modes. In either operation, a valve 77 permits hot catalyst particles to flow from the regeneration 34 to into retention chamber 93. In one mode, a conduit 81 is usually present. Fluidizing gas that passes into retention chamber 93 and ultimately out through conduit 81 supplies a primary driving force for the return of catalyst to the regenerator. In this mode of operation fluidizing gas from vent 81 may be returned to the upper level of dense bed 34 via line 83, above the top level 35 of the dense bed via line 85 or directly into the flue gas line 40. For average pressure differentials, the time period for filling chamber 93 and for displacing catalyst from chamber 93 is normally in a range of from 3 seconds to 15 minutes.

When conduit 81 is absent or closed by valve 95, the heat exchanger 70 will typically operate in a limited pressure mode wherein the pressure in the catalyst cooler does not exceed the maximum pressure in the regeneration vessel 10. In such an operation the only driving force for the movement of catalyst into the cooler is the relative pressure head between the regenerator 10 and heat exchanger 70. At or before the point at which the pressure equalizes between heat exchanger 70 and catalyst bed 34, valve 77 partially closes to limit flow or fully closes to prevent flow through line 73. A valve 79 across line 71, which was at least partially closed to restrict gas and catalyst flow across line 71 or preferably completely closed to stop catalyst flow through line 71, opens and gas transports catalyst through line 71 and into regenerator 10 at an outlet point having a lower pressure than the withdrawal point for line 73. Without fluidizing gas the maximum driving force for the movement of catalyst through heat exchanger 70 is the pressure differential between the inlet point for line 71 and the withdrawal point for line 73. The flow of fluidizing gas into the heat exchanger 70 by line 69 may provide additional gas flow or pressure head to aid in the transfer of catalyst through line 71. In this type of arrangement the outlet for line 71 from heat exchanger 70 should be located as close to the bottom of heat exchanger 70 as possible.

The cooler arrangement of this invention may also use multiple lines for the supply and return of particulate material. A two-line system aids repairs by allowing the isolation of any particular line for repair or replacement of components. From an operational standpoint multi-line systems allow selected variations for the point of withdrawal and return of particulate material with respect to the bed providing particles. FIG. 1 shows such an arrangement wherein a control valve 91 may be opened and control valve 97 closed to return cooled catalyst particles back to catalyst bed 34. Alternately, to concentrate the cooling effects of catalyst cooler 70 in riser 20, closing valve 91 and opening valve 97 will deliver all of the cooled catalyst directly to reactor riser 20 via line 89. Such delivery of cooled catalyst directly to the reactor riser often provides process advantages by increasing the catalyst to oil ratio in the reaction zone. It is also possible to effect similar changes in addition and withdrawal point location by the previously described reversing of the function of the supply and return lines.

Figure 2:
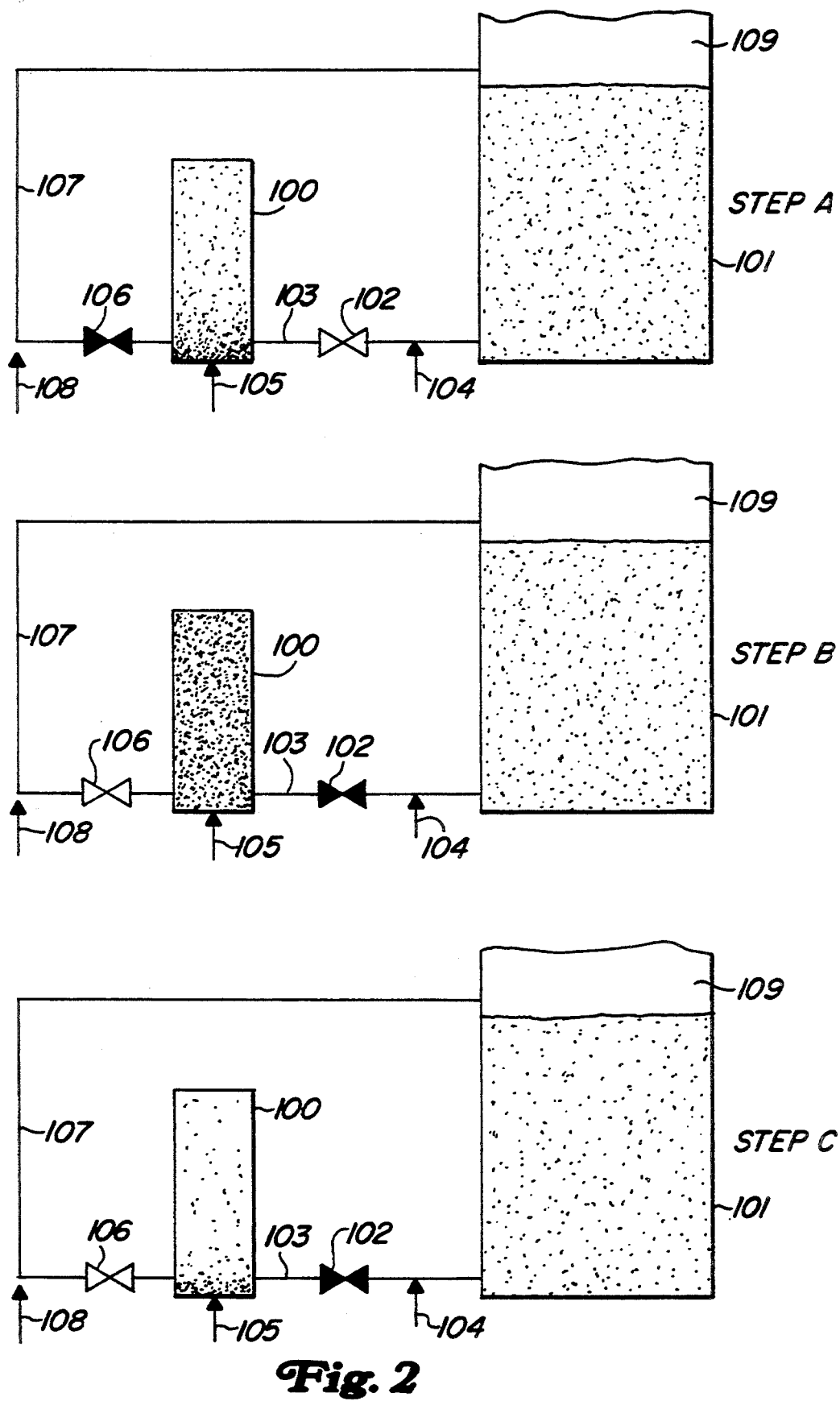
FIG. 2 is a schematic representation of operational modes for transferring particles into and out of a heat exchange zone operated in accordance with this invention.

Looking then at FIG. 2, a very simple mode of heat exchanger operation is depicted. The operation begins with the filling of heat exchange zone 100 with particulate material from bed 101. In this mode of operation, particulate material flows through a supply conduit 103 across a supply valve 102 into heat exchange zone 100. Heat exchange zone 100 has a lower pressure than the bottom of catalyst bed 101 at the start of the filling step. Fluidizing gas may flow from a line 104 into a line 103 to aid in the transport of particulate material. As catalyst fills heat exchange zone 100, indirect heat exchange of the particulate material with heat exchange coils (not shown) transfers heat to or from the catalyst. A nozzle 105 may introduce additional fluidizing gas into heat exchange 100 to promote better heat exchange between the particulate material and the cooling coils. Heat exchange zone 100 approaches its maximum full condition as the pressure difference between particle bed 101 and heat exchange zone 100 equalizes.

Step (b) depicts the beginning of the emptying step for heat exchange zone 100. After a desired contact time between the particulate material and the cooling coils in heat exchange zone 100 or after a sufficient approach to pressure equalization between bed 101 and heat exchange zone 100, valve 102 closes to prevent further catalyst flow across line 103 and a valve 106, across a line 107, opens. Line 107 discharges particulate material and gases from the heat exchange zone to a location having a lower relatively lower pressure than the pressure at the point from which particulate material is withdrawn from bed 101. As depicted in step (b), line 107 transfers particulate material to an upper location of catalyst bed 101. Preferably the gas and particulate mixture will return to a dilute phase section 109 of catalyst bed 101. A line 108, provides an optional supply of fluidizing gas to assist in the transport of particulate material through line 107.

Step (c) depicts the end of the heat exchange zone emptying step. At the typical end of the emptying step, pressure between heat exchange zone 100 and dilute phase section 109 has substantially equalized and particulate material and gas flow through line 107 has stopped except for any entering fluidizing gas. Another fill and empty cycle for the heat exchanger will begin with the opening of valve 102 and the closing of 106.

The operational description of FIG. 2 has been described in idealized terms. It is possible to only partially close and open valves 102 and still effect a transfer of catalyst through heat exchanger 100. In an extreme case, where there is a large supply of catalyst head from bed 101, a sufficient flow of fluidizing gas through line 108 can create dense phase conditions in line 107 that will provide a continual circulation of particulate material through heat exchanger 100 with valves 102 and 106 fully open. In another operational technique the flow of fluidizing gas through line 105 may also be increased when valve 102 is in a closed position to provide additional gas flow for an essential complete evacuation of catalyst particles from heat exchange zone 100.

Figure 3:
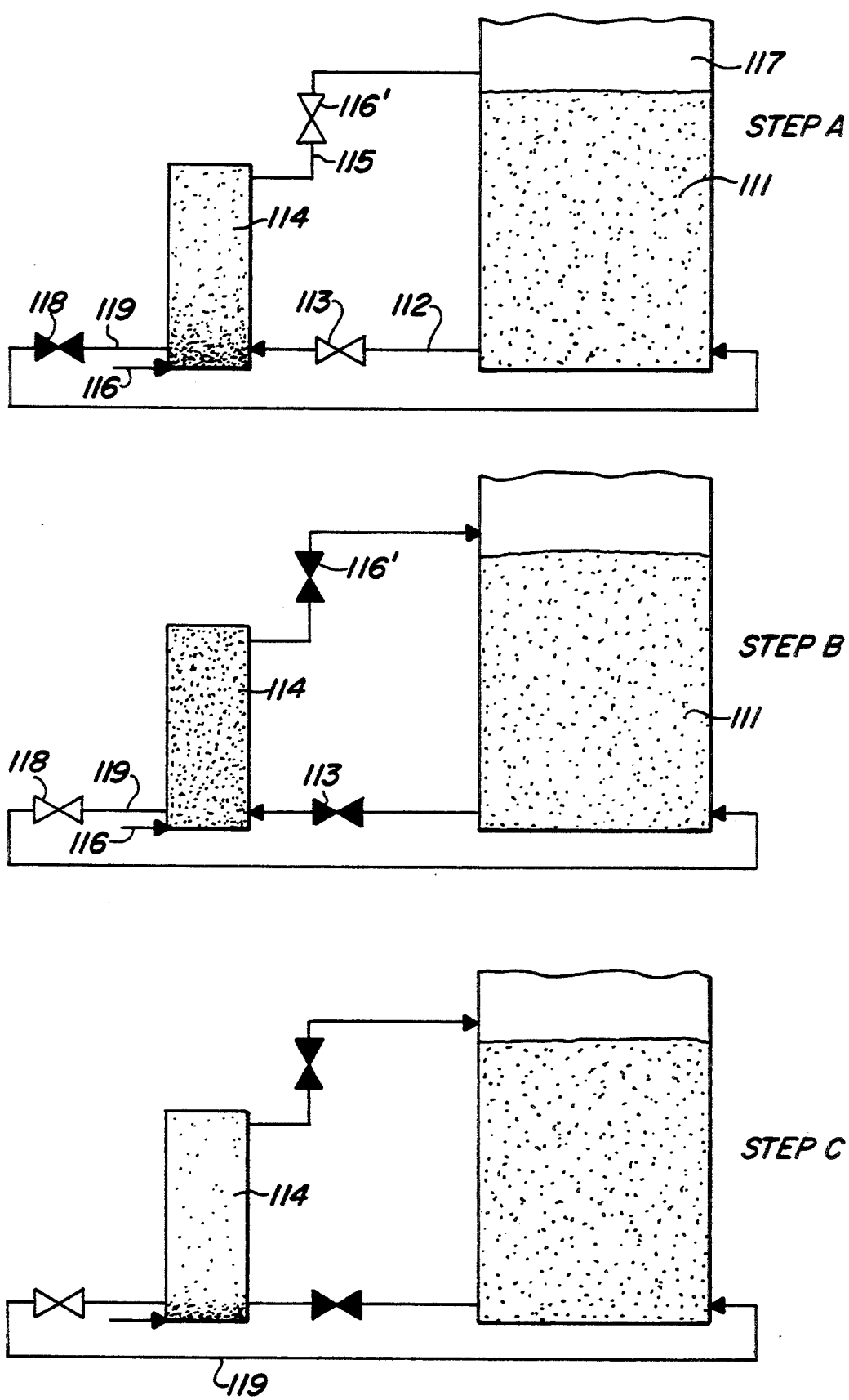
FIG. 3 schematically shows the alternate operational modes for a different arrangement of the heat exchange zone of this invention.

A more preferred method of practicing the invention uses a gas stream such as fluidizing gas to positively displace catalyst particles from the heat exchange zone. This is preferred as the primary mode of operation and is more fully explained in conjunction with FIG. 3. Step (a) depicts the fill step wherein particulate material from a bed 111 passes through a line 112 across an open control valve 113 into a heat exchange zone 114. A line 115 vents fluidizing gas, entering from a line 116, and gas displaced by particulate material, entering via line 112, across a control valve 116" and into a dilute phase 117 of catalyst bed 111. Throughout this fill step, a control valve 118 blocks any flow of particulate material across a line 119.

Closing of control valves 113 and 116" along with the opening of control valve 118, begins the emptying of particulate material from heat exchange zone 114 as depicted by Step b. The continued entry of fluidizing gas from line 116 builds up pressure in an upper portion of heat exchange zone 114. The build up of pressure forces particulate material out of heat exchanger 114 through line 119 and into particle bed 111. The additional pressure supplied by line 116 permits particle return line 119 to discharge particulate material at any location in bed 111.

Step (c) shows the condition of heat exchange zone 114 at the end of the emptying step where essentially all of the particulate material has been evacuated from zone 114 via line 119. Step c depicts the heat exchange zone 114 in a condition to restart the cycle with step (a) and the filling of the heat exchange zone.

The arrangement valving arrangement and the remote location of the catalyst cooler confers a number of benefits. The operational description of the heat exchanger shows an essentially complete evacuation of catalyst particles. This is another advantage of having the remote location of the heat exchanger of this invention relative to the particle bed, wherein it is not necessary to keep cooling coils constantly submerged in catalyst. In addition, to increase the volumetric circulation of particulate material through the heat exchanger zone, cooling coils within the heat exchange zone need not traverse the entire length or width of the heat exchange zone. Accordingly, the volume of the heat exchange zone used as a catalyst retention volume or chamber, may include a volume with or without cooling coils located therein. An important operational feature of the remote heat exchange zone is the ability remove the zone from service without interfering with operation of the bed supplying the particulate material. In other words, in an FCC operation double blocked valves may be supplied on all the lines carrying catalyst or hot gases between the cooling zone and a regeneration vessel. By closing these blocked valves, the cooler may be completely isolated from the high temperatures of the regeneration vessel to allow maintenance such as to bundle, repair, or replacement. In addition to block valves, the use of valveless systems to control catalyst flow can further enhance the reliability of the heat exchanger operation.

Operation of this invention with one heat exchange zone or heat exchanger may cause cyclic fluctuations in the catalyst temperature. In the case of a fluidized catalytic cracking process, such cyclic fluctuations in the catalyst temperature will not generally disrupt the operation of the regeneration due to the large volume of the catalyst present in the regenerator. Nevertheless cyclic variations in catalyst temperatures within the cooler may vary the temperature of the cooling medium. The use of multiple heat exchangers, operating out of phase, avoids variations in the temperature of the cooling medium and can provide a constant inflow and outflow of catalyst.

Figure 4A:
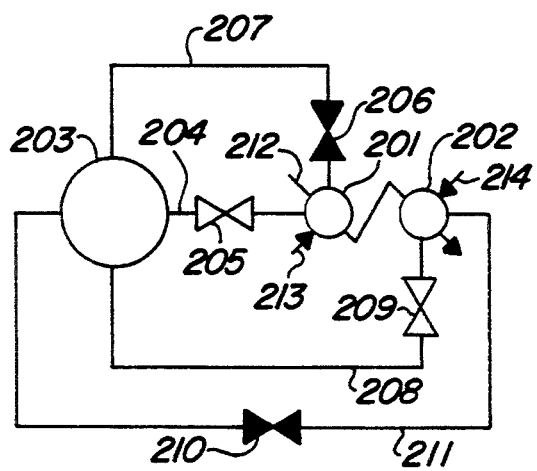
FIGS. 4A and 4B are schematic representations of different operational modes of a two-heat exchange zone system operated in accordance with this invention.
Figure 4B:
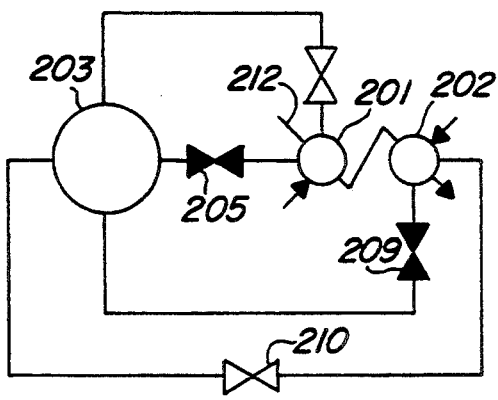

An arrangement showing the use of two heat exchangers is depicted in FIG. 4. FIG. 4A shows the filling of exchanger 201 and the emptying of exchanger 202. Particulate material flows from a particulate bed contained in a vessel 203 across a supply line 204 through an open control valve 205 into exchanger 201. A closed control valve 206 prevents the flow of particulate material from exchanger 201 back into the bed of vessel 203 through a line 207. Heat exchanger 202, having a higher pressure than exchanger 201, pushes particulate material through a line 208 across a control valve 209 into a bed of particulate material in vessel 203. A control valve 210 prevents any flow of particulate material from vessel 203 across a line 211 into exchanger 202. A flow of fluidizing gas from lines 213 and 214 may effect additional pressurization or fluidization through exchangers 201 and 202. Throughout the filling of exchanger 201 and the emptying of exchanger 202, a cooling medium flows in series through the two exchangers through a line 212. The cooling water may pass through exchangers 201 and 202 in series flow or in parallel flow. Parallel flow is preferred since it will provide a more constant temperature for the cooling water. Once exchanger 202 is filled and exchanger 202 is emptied the cycle typically reverses with the changing of the valve positions to those depicted in FIG. 4B such that control valve 205 is closed and control valve 206 is open to empty exchanger 201 and control valve 210 is open and control valve 209 is closed to fill exchanger 202.

Figure 5A:
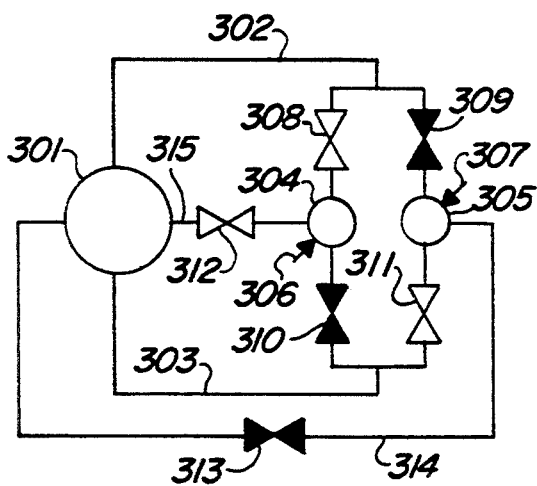
FIGS. 5A and 5B schematically show a modified two-heat exchange zone arrangement operated in accordance with this invention.
Figure 5B:
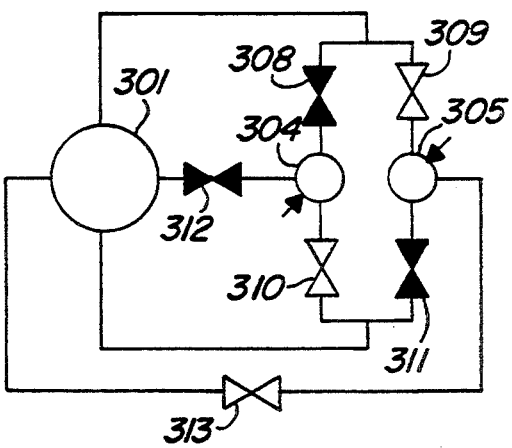

A preferred two exchanger system is shown in FIGS. 5A and 5B. This system withdraws particulate material from a particle bed contained in a pressure vessel 301 via line 302 and returns heat exchange particles to the particle bed of pressure vessel 301 via a line 303 at a relatively constant rate. FIG. 5A shows pressure vessel 301, a pair of heat exchangers 304 and 305, and the control system in schematic form. Exchangers 304 and 305 again alternate between a fill and an empty mode as discussed in-relation to the arrangement shown in FIG. 4. Exchangers 304 and 305 receive fluidizing gas from lines 306 and 307 respectively. The fill cycle for exchanger 304 begins by opening control valve 308 and closing control valve 309 to direct particles from pressure vessel into exchanger 304. As exchanger 304 fills, exchanger 305 empties by closing control valve 310 and opening control valve 311 to direct heat exchanged particulate material into return line 303. Normally a control valve 312, maintained in an open position during the filling of exchanger 304, will vent fluidizing gas into pressure vessel 301 through a line 315. Normally fluidizing gas also facilitates the emptying of exchanger 305. To accomplish this a control valve 313 blocks fluid flow across a vent line 314 to build pressure in exchanger 307 and force particulate material out of the heat exchanger through line 303. After exchanger 304 is filled and exchanger 305 empties, an immediate reversal of the cycle takes place by reversing the position of all the control valves such that exchanger 304 begins an emptying step and exchanger 305 begins a fill step as shown by FIG. 5B. Throughout the filling and emptying steps a heat exchange fluid, typically water, passes through the heat exchangers in series or in the preferred parallel flow. In addition to the other advantages of a two-exchanger system, the arrangement shown in FIG. 5 also has the advantage of reducing thermal cycles on the supply and return lines since the major portion of these lines have a constant flow of particulate material and maintain steady state temperature conditions.

The two-exchanger heat exchange will normally run constantly through all cycles. However, either exchanger may be blocked in by the valve system to allow servicing of the heat exchanger while some heat exchange and particulate material continues through one or more other exchangers in the multiple-heat exchanger arrangement.

Those skilled in the art will be aware of other alternative arrangements which are not limited except by the scope of the appended claims.

We claim:

1. A method for indirect heat exchange between fluidized particles and a heat exchange fluid comprising:
   a) collecting particles in a particle bed;
   b) transferring said particles out of said bed into a particle retention volume of a heat exchange zone through a first particle conduit;

c) passing a fluidizing gas into said particle retention volume;

d) transferring heat between the particles in said heat exchange zone and a heat transfer fluid by indirect heat exchange in said heat exchange zone;

e) transferring at least a portion of said particles out of said particle retention volume and into said bed through a second particle conduit; and, f) cyclicly pressurizing and depressurizing said particle retention volume to effect said transfer of particles into said particle retention volume through said first particle conduit and said transfer of particles out of said particle retention volume through said second particle conduit.

2. The process of claim 1 wherein the transfer of particles out of said bed and into said particle retention volume pressurizes said particle retention volume and the transfer of particles out of said particle retention volume and into said bed depressurizes said particle retention volume.

3. The process of claim 2 wherein said fluidizing gas passes into at least one of said first particle conduit and said particle retention volume, said fluidizing gas at least partially pressurizes said particle retention volume and the transfer of particles from said particle retention volume to said bed through said second particle conduit vents fluidizing gas into said bed.

4. The process of claim 1 wherein said fluidizing gas passes into at least one of said first particle conduit, said particle retention volume and said second particle conduit.

5. The process of claim 4 wherein said fluidizing gas is vented from said particle retention volume through a vent conduit and restriction of flow through said vent conduit at least partially pressurizes said particle retention volume and unrestricted flow of fluidizing gas through said vent conduit at least partially depressurizes said particle retention volume.

6. The process of claim 5 wherein said fluid flow through said vent conduit is unrestricted to effect the transfer of particles from said bed into said particle retention volume through said first particle conduit and said vent conduit is closed to effect the transfer of particles out of said catalyst retention volume into said bed through said second particle conduit.

7. The process of claim 6 wherein fluidizing gas flows directly into said particle retention volume.

8. The process of claim 1 wherein the flow of particles though said second particle conduit is restricted when particles are transferred into said particle retention volume through said first particle conduit and the flow of particles through said first particle conduit is restricted when particles are transferred out of said particle exchange volume through said second particle conduit.

9. The process of claim 1 wherein said particles are catalyst and indirect heat exchange of the catalyst with the heat exchange fluid produces cooled catalyst.

10. The process of claim 1 wherein said first particle conduit supplies particles to, and said second particle conduit receives particles from, at least two heat exchange zones.

* * * * *